United States Patent [19]

Jacobs

[11] Patent Number: 4,716,926

[45] Date of Patent: Jan. 5, 1988

[54] HOUSING FOR HEAT INSULATING ARMATURES AND/OR FLANGE CONNECTORS

[76] Inventor: Ludwig Jacobs, Lagesche Strasse 8, D-4790 Paderborn, Fed. Rep. of Germany

[21] Appl. No.: 833,985

[22] Filed: Feb. 26, 1986

[51] Int. Cl.[4] ............................................. F16L 59/16
[52] U.S. Cl. ................................... 137/375; 137/312; 285/47
[58] Field of Search .................. 137/375, 312; 285/47, 285/48

[56] References Cited

U.S. PATENT DOCUMENTS

| 1,108,840 | 8/1914 | Franke | 137/375 |
|---|---|---|---|
| 1,978,608 | 10/1934 | Straty | 285/47 |
| 2,693,822 | 11/1954 | Gerow et al. | 137/312 |
| 2,742,384 | 4/1956 | Burleson | 285/47 |
| 2,867,095 | 1/1959 | Robbie | 137/312 |
| 3,559,694 | 2/1971 | Volberg | 285/47 |
| 3,724,491 | 4/1973 | Knudsen et al. | 137/375 |
| 4,207,918 | 6/1980 | Burns et al. | 137/375 |
| 4,259,981 | 4/1981 | Busse | 137/375 |
| 4,541,613 | 9/1985 | Barbe | 137/375 |

FOREIGN PATENT DOCUMENTS

| 0141986 | 9/1984 | European Pat. Off. |
|---|---|---|
| 2400306 | 1/1974 | Fed. Rep. of Germany |
| 2411161 | 3/1974 | Fed. Rep. of Germany |
| 7436866 | 2/1975 | Fed. Rep. of Germany |
| 7604016 | 6/1976 | Fed. Rep. of Germany |
| 7723822 | 3/1978 | Fed. Rep. of Germany |
| 8123840 | 8/1981 | Fed. Rep. of Germany |
| 8217526 | 6/1982 | Fed. Rep. of Germany |
| 8218796 | 7/1982 | Fed. Rep. of Germany |
| 3338633 | 10/1983 | Fed. Rep. of Germany |

Primary Examiner—A. Michael Chambers
Assistant Examiner—John C. Fox
Attorney, Agent, or Firm—Antonelli, Terry & Wands

[57] ABSTRACT

A housing for heat insulated armatures and/or flange connections with two box like housing parts, wherein different dimensions of pipelines or and actuating device for an armature, for example, a control gate, is compensated by at least one adapter piece, whereby the adapter piece as well as the housing parts are designed in a heat insulating manner.

9 Claims, 4 Drawing Figures

HOUSING FOR HEAT INSULATING ARMATURES AND/OR FLANGE CONNECTORS

BACKGROUND OF THE INVENTION

The invention relates to a housing for heat insulating armatures and/or flanged pipe fitting connections with two box like housing parts with preferably two openings for pipelines and, in particular, a further opening for the actuating device of the armature being disposed outside of the housing, whereby the housing parts have at least one flange adjacent the housing separating plane and with the housing parts being detachably connected with each other by screws which extend through circumferential segments of the housing parts in form of mounting flanges, whereby centering means are provided in the housing parts which preferably define the centering installation position of the housing parts toward each other and which are connected in one piece with the housing parts and interlock forcibly with each other being designed like a groove and tongue joint extending at least over portions of the circumference of the housing parts.

A housing of the aforementioned type is proposed in, for example, U.S. Pat. No. 3,724,491. A disadvantage of this proposed housing resides in the fact that it is difficult to assemble and disassemble due to the provision of a plurality of screws. The screws on the covered rear side of the housing cannot be mounted in tight spatial conditions, and consequently, this housing could only be used when sufficient space is available on all sides for assembly and disassembly.

A housing for heat insulated pipeline gates including two box like housing parts with two coaxial openings for the pipelines and a further opening for the gate actuating device which is disposed outside of the housing is also proposed in DE-GM No. 74 36 866, whereby the openings are about halved from the separating plane of the housing and whereby each housing half is providing with a circumferential flange adjacent to the housing separating plane being only interrupted by the housing openings, with each housing opening being limited by an annular like sleeve in such a manner that the ends of the circumferential flange segments are connected with each other in the area of the housing openings by means of a semi-ring sleeve. The circumferential flanges extend outwardly with sharp edges, that is, rectangularly with respect to the circumferential plane of the housing halves and are detachably connected with each other by push button mounting elements which extend through holes in the circumferential flanges.

When handling the housing parts, the outwardly extending circumferential flanges interfere therewith, and in particular, in tight spatial conditions may result in damages to the hands of the person being employed with the assembly of such housing parts. Moreover, these outwardly extending circumferential flanges require a larger accommodating space which is often not available. Since the housing parts have to be frequently detached and again reassembled, because urgent necessary maintenance and/or repair operations are required on the armatures, for example, on the control gates, a further disadvantage exists in that the push button connection wears out and no longer reliably connects the housing parts.

It has also been proposed to provide the housing parts around armatures and/or pipe flanges and to arrest the housing parts against each other by bands and toggle lever locking means however, the assembly of such a housing is cumbersome and, in practice, many bands are lost. Consequently, the housing parts are then assembled only partially or not at all after performing maintenance and/or repair operations so that the housing cannot completely fulfill its function. Moreover, this construction causes considerable difficulties in tight spatial conditions when detaching and reassembling the housing parts because the housing parts can only be brought into a precise position with respect to each other under extreme difficulties. Furthermore, this solution is expensive and the care or maintenance of the personnel assembling the housing.

In, for example, German patent application No. 0 33 38 633.1-25 and the corresponding European patent application a housing in accordance with the aforementioned type is proposed, whereby the invention relates to a housing for heat insulated armatures and/or flange connections with two box like housing parts with preferably two openings for the pipelines and, in particular, a further opening for the actuating device disposed outside of the housing, whereby each of the housing parts are provided with at least one flange adjacent to the housing separating plane, and the housing parts are detachably connected with each other by screws which extending through circumferential segments of the housing parts in form of mounting flanges, whereby centering means are provided which are connected with the housing parts in one piece defining the centering installation position of the housing parts toward each other and forcibly interlock with each other being dsigned like a groove and tongue joint extending at least over a portion of the circumference of the housing parts.

In view of the fact that the mounting flanges in the above-mentioned patent applications are directed inwardly, that is, directed to the inside of the housing, no interfering parts are present at an outside thereof. Thus, such a housing can be constructed with relative small outer dimensions. Also, no sharp edges protrude to the outside on which injuries may occur.

Due to the screws which are mounted at only one side, the housing parts may be pulled towards their centering means, so that a particularly stable unmovable position of the housing parts is obtained not only in axial direction of the housing but also in a transverse direction thereto. The accessibility of these mounting screws is always possible, since they can be positioned that they are disposed on a very well accessible location.

All in all a robust construction is obtained. The centering means can be easily tipstretched during the making of the housing without any problems. This is true for a housing made of a metallic material, for example, sheet metal, as well as for plastic housing parts.

Due to the centering means the housing parts may be installed "blind" in tight space corners in an operational position and assembled. Thereby, the housing parts are centered practically over the total circumference of the housing axially and radially and cannot diplace in a diagonal direction with respect to each other, for example. Thus, the housing gets an overall attractive accurate outside appearance on which not too much dirt can accumulate. The housing parts can be pulled together tightly with the mounting screws, so that the housing parts abut each other in a jointless manner.

Within the framework of the above-mentioned German and European patent applications an embodiment is present wherein the centering means enable a good centering of the housing parts by forcible interlocking of trapezoidally shaped grooves and crimps, on the one hand, and such centering means have a high resistance moment against deformation, on the other hand, so that no relative movement of the housing parts toward each other can occur even with relative high diagonal stress which could act on such a housing, for example, pushing or knocking. Moreover, the housing parts remain a flush position with respect to each other after the interlocking of the centering means.

In the above-noted applications, the mounting screws are nondetachably mounted on at least one of the housing parts. Thus, the screws cannot get lost even after a repeated disassembly of the housing, for example, cannot drop on the floor of tight basement spaces. In view of a particular design of the screw holes it is assured that even long mounting screws can be reliably guided in the screw holes which are provided in the flanges, so that no long finding and/or adjustment operations are required, so as to bring the screws into a precise fitting position for tightening.

An object of the present invention resides in providing a housing of the aforementioned type which enables different pipe and/or different dimensions of an actuating device such as, for example, a height of spindles and/or spindle diameters to be taken into consideration.

adjuster piece, adjustable in an axial direction and/or in a diameter thereof is provided for the actuating device of the armature which is provided outside of the housing and/or one or more pipelines for compensating different dimensions of the actuating devices, the axial length of the actuating device and/or its diameter and/or the pipelines.

By virture of the features of the invention a housing is quickly adaptable for the given dimensions of the actuating device of the armature, for example, a spindle housing, and/or different pipe dimensions in a rapid and simple manner.

Thus it is easy to maintain a supply because for certain armature sizes the same housing parts are always maintained in storage., while different types of actuating devices can be taken into consideration by a corresponding adapter piece. This adaptability on different dimensions, for example, actuating devices of the armature may be effected at the place of assembly directly by the heating mechanic, so that an assortment of adapter pieces may be made for a certain housing type which take into consideration all commercially available actuating devices.

In accordance with the present invention, a housing for heat insulated armatures and/or flange connecting members includes two box-like housing parts with the housing parts including two openings for accommodating pipe lines and a further opening for accommodating an actuating device for actuating the armature or pipe fitting, with the actuating device being disposed exteriorly of the housing. The housing parts include at least one flange adapted to be joined along a separating plane disposed adjacent the housing parts. The housing parts are detachably connected together by screws which extend through circumferential segments of the housing parts. Centering means are provided in the housing parts which define a centering installation position of the housing parts with respect to each other, and forceably interlock with each other in a tongue and groove arrangement extending over at least portions of the circumference of the housing parts. Means for adjusting the axial extension of the actuating device of the armature or pipe fitting are provided.

In accordance with further advantageous features of the present invention, the means for adjusting the axial extension of the actuating device, is locked within the opening for accommodating the actuating device and is adjustable in an axial direction and also capable of being held at its desired location. By this arrangement, the adapter piece is disposed in a friction fit manner in an opening of the corresponding housing half, for example. The adapter piece may, for example, be provided for the actuating device and moved more or less into the associated opening in accordance with the height of the actuating device. These adjustment operations may be performed without tools in a relatively short period of time.

Advantageously, according to the present invention, the means for adjusting the actual extension of the actuating device has the same wall thickness and/or insulating thickness as the housing parts. By virtue of this feature it is assured that the adapter piece has the same heat insulation as the housing parts.

In accordance with still further features of the present invention, the adjuster means is provided with a conduit section extending in an actual direction and includes a discharge groove for discharging of fluid. With such an arrangement, if the packing box of the actuating device starts to leak, the leaking liquid can discharge to the outside by the discharge groove and the conduit segment. For this purpose, the housing is normally mounted in such a manner that the adapter piece with the discharge groove and the subsequent conduit segment point downwardly, so that the liquid is discharged by gravity.

It is also possible in accordance with the present invention, to provide a housing wherein the housing parts and/or the adjuster means is provided with a highly reflective coating on its inner wall. Preferably, the highly reflective coating is made of aluminum.

By providing a housing in which the housing parts and/or the adjuster means have a hollow box-like shape and in which the hollow spaces are filled with a suitable insulating material, for example, polyurethane foam, the adapter pieces as well as the housing parts may be made in one piece in a hollow box like manner made from a suitable plastic material, for example, by injection molding. Suitable heat insulating materials, for example, polyurethane foams may be mounted into the hollow spaces which immaterially increase the weight.

In accordance with additional features of the present invention, the walls of the adjuster means and/or the housing parts consists of a plastic which is resistant to impact, scratch, ozone and the mediums it will come into contact during operation, such as, for example, polypropylene.

By providing at least one of the housing parts with a crimp-like stamped out portion on its circumference which co-act with guide sleeves, and are penetrated with a mounting screw which is provided with a thread only at its end segment and which can be screwed into the bore of an associated mounting flange on the other housing part, and especially wherein the mounting screw engages into a pocket bore which is provided in the plane of the tongue and groove arrangement, it is possible to forego the inwardly directed flange as provided in the above-described patent applications. Moreover, it is possible to design the groove-tongue connection in such a manner that they are not only designed as axial and/or radial arresting means, but also as a flange. The mounting screws engage in areas of these groove-tongue connection in pocket bores which are provided for this purpose in a space saving and from the outside invisible manner. However, one may provide inwardly directed flanges additionally or instead thereof, whereby the mounting is accomplished by screws as proposed in the above-described patent applications.

Advantageously, in accordance with the present invention, the adjuster means is designed as a screwable piece.

The drawing schematically illustrates the invention in conjunction with exemplified embodiments.

DETAILED DESCRIPTION OF THE DRAWINGS

Figure 1:
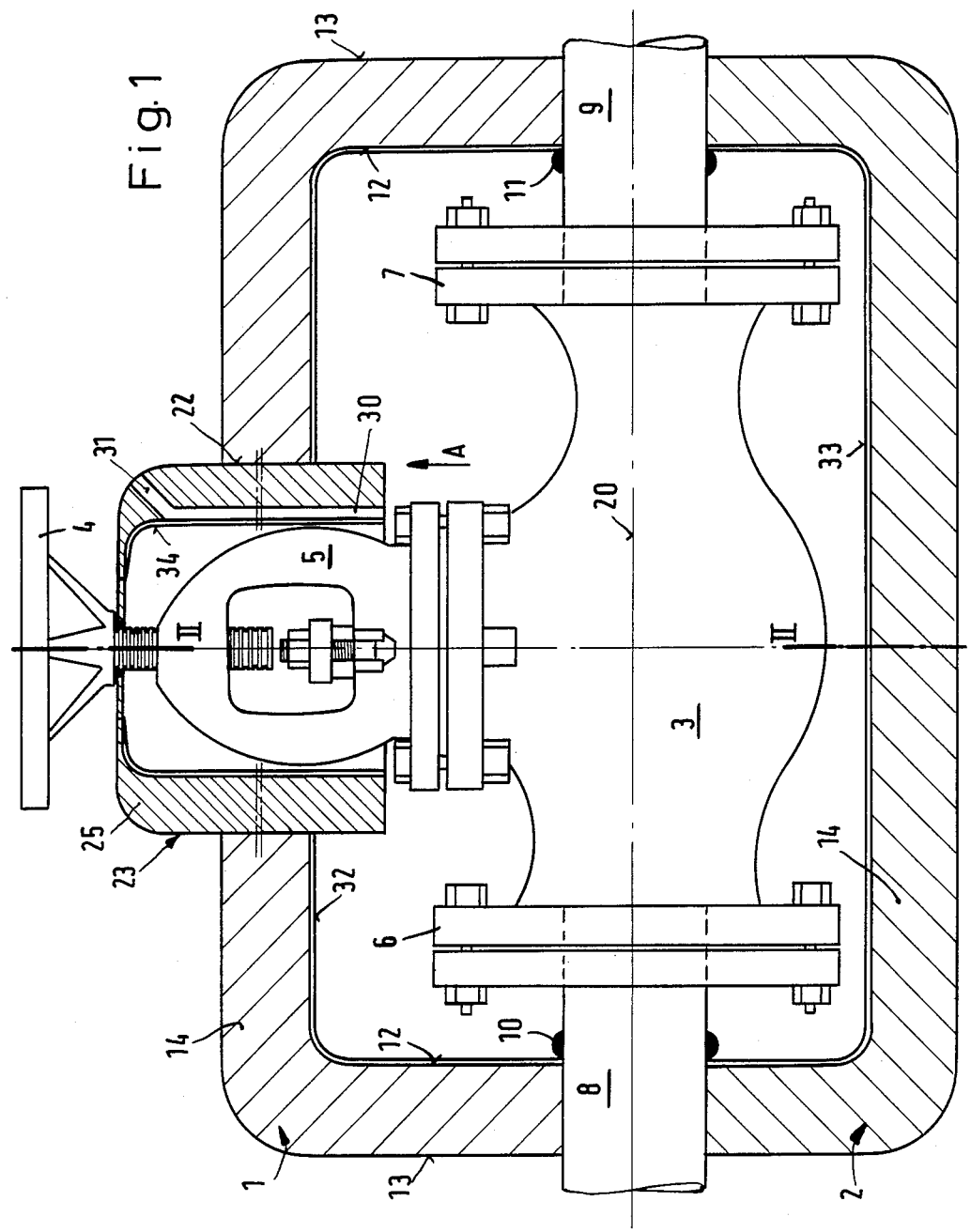
FIG. 1 a housing in accordance with the invention in a longitudinal section around a control gate with actuating device and mounted with flanged lines on the armature which extend from the housing.

Referring to the drawings, wherein like reference numerals are used throughout the various views to designate like parts and, more particularly, to FIG. 1, housing parts 1, 2 insulate an armature or fitting 3 toward the outside against loss of heat, with the armature being designed as a control gate with an actuating device 5 provided with a manual wheel 4. A pipe line 8, 9 is respectively flanged onto flanges 6, 7 of the armature 3. The armature 3 and its associated actuating device 5 with manual wheel 4 is a commercially available type. Any other armature or flange connection may be provided within housing parts 1 2, instead of an armature 3. Packings 10, 11 are provided for sealing the pipe line 8, 9 from the outside.

The housing parts 1, 2 are shaped as hollow boxes including walls 12 or 13 formed of a suitable push and knock proof plastic material which is also resistant against the subject mediums as well as ozone resistant and fast to light, for example, polypropylene, or a polyurethane or the like.

The hollow spaces formed between the walls 12, 13 in the illustrated embodiment are filled with a heat insulating material, and, in particular, with polyurethane foam 14. Instead of polyurethane foam 14 one can use any other suitable heat insulating material such as, for example, slag wool or glass wool, or the like. The weight of the housing parts 1, 2 is only immaterially increased by the introducing of the plastic foams into the hollow spaces which are limited by walls 12, 13, so that they can be easily handled.

Figure 2:
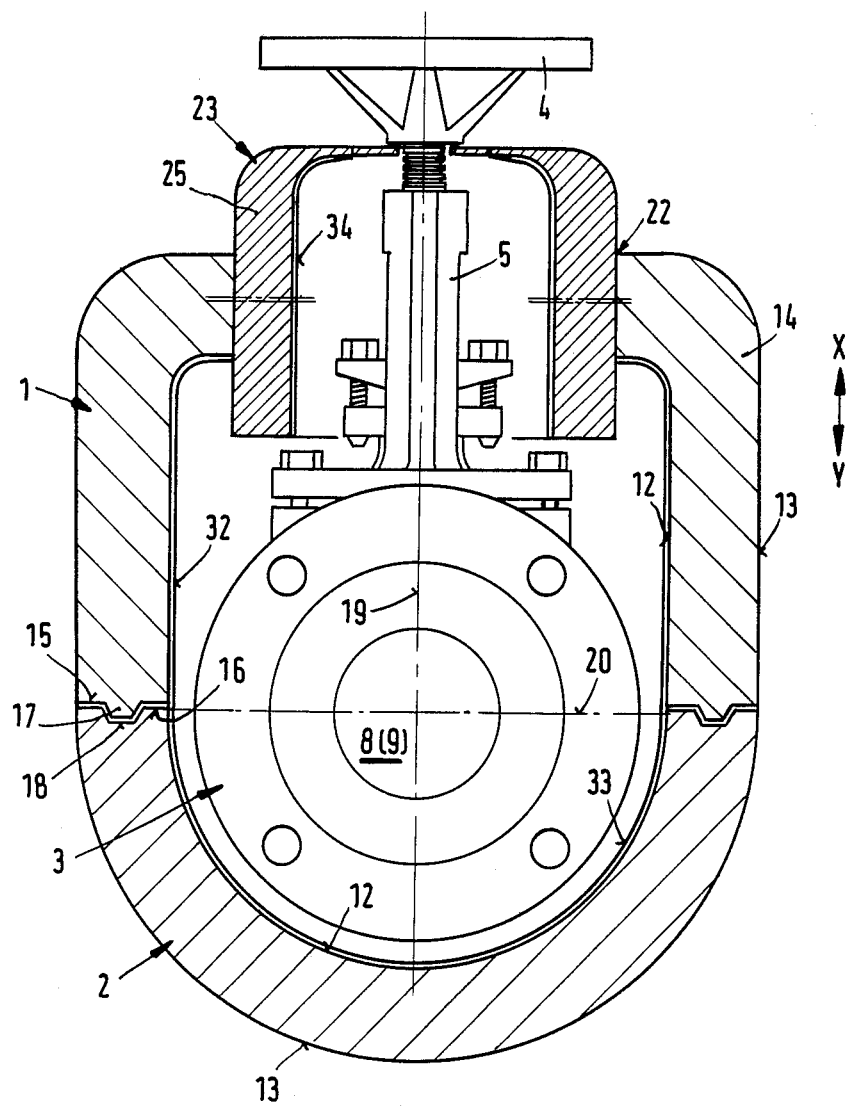
FIG. 2 a cross section in accordance with line II—II of FIG. 1.
Figure 3:
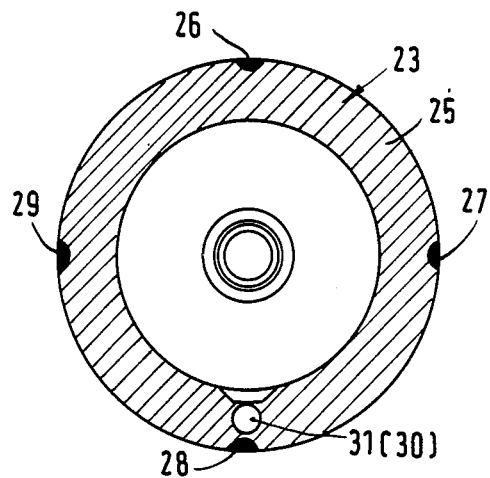
FIG. 3 an adapter piece in the view of arrow A in FIG. 1.

As shown in FIG. 2, the housing parts 1, 2 are in contact with each other by opposing flanges 15, 16. The housing part 1 is provided with a cross section illustrated in FIG. 2 and a spring in form of a trapezoidal protrusion 17 which engages into an adapted groove 18, so that the trapezoidal protrusion 17 and groove 18 form a groove-tongue connection which radially arrest the housing parts 1, 2. Within the plane formed by flanges 15, 16 a screw, not illustrated, is undetachably mounted in crimp like recesses of the one housing part, for example, housing part 1, and engages into pocket bores in the counter face of the other housing part 2, along the plane formed by flanges 15, 16. For example, two such mounting screws may be provided at each side of the center axis 19 at a distance spaced apart from each other. In FIG. 2 it can be seen that the flanges 15, 16 and thereby the groove-tongue connection 17, 18 are disposed in the plane of the housing cross center axis 20. This cross center axis 20 extends through the center point of lines 8 and 9.

An opening 22 which in the illustrated embodiment is circular in its cross section is provided coaxially with respect to the actuating device 5 in housing part 1 through which the adapter piece 23 extends and which is also hollow in the same manner as housing parts 1, 2 and also is formed of the same material as housing parts 1, 2. The hollow space 24 may be filled with the same heat insulating material 25, for example, plastic foam, as housing parts 1,2. The adapter piece 23 encompasses with a radial distance the actuating device 5 and is adjustably mounted in its axial direction, that is, in direction X or Y. In the illustrated embodiment the adapter piece 23 is provided with guide grooves 26,27,28 and 29 being uniformly distributed over its circumference and which engage into corresponding protrusions of housing part 1. These guide grooves 26 to 29 and the associated protrusions of housing part 1 may be omitted.

Figure 4:
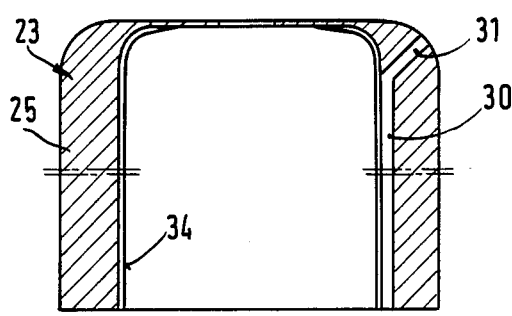
FIG. 4 the adapter piece from FIG. 3 in the longitudinal sectional view in accordance with FIG. 1.

From FIGS. 1 and 4 it can be seen that a dicharge groove 30 is provided within adapter piece 23 which discharges into a truncated subsequent outwardly extending conduit segment 31. Eventually collecting dripping water runs through this discharge groove 30 and conduit 31, whereby this water may leak through the packing box of the actuating device 5. For this purpose, the housing is mounted so that the actuating device 5 points downwardly, so that the dripping water runs off by gravity.

As can be seen the housing parts 1, 2 can be left unchanged for certain application areas, while different heights (lengths) of the actuating device 5 and/or diameters may be compensated by exchanging the adapter pieces 23.

With the same diameter of the actuating device 5, a different length may be compensated by an axial adjustment in the direction X or Y of the adapter pieces 23, which can be accomplished, for example, by a more or less displacing of the corresponding adapter piece. An excellent heat reflecting layer, for example, an aluminum coating 32, 33 or 34 may be provided.

While I have shown and described several embodiments in accordance with the present invention, it is understood that the same is not limited thereto but is succeptable to numerous changes and modifications as known to one having ordinary skill in the art, and I therefore do not wish to be limited to the details shown and described herein, but intend to cover all such modifications as are encompassed by the scope of the appended claims.

I claim:

1. Housing for heat insulating of a flanged pipe fitting member provided with flange connections at respective ends thereof, the housing including:
    two box-like housing portions and two openings for shaped pipe lines to be connected to said flange connections,
    a further opening for accommodating an actuating device for actuating the flanged pipe fitting member, said actuating device being located exteriorly of the housing, each of said housing parts including at least one flange adapted to be joined along a separating plane, means disposed adjacent the separating plane and extending through circumferential segments of the housing parts for detachably connecting the housing parts to each other, centering means provided in said housing parts for defining a centering installation position of the housing parts with respect to each other and which are connected in one piece with the housing parts, said centering means including a tongue and groove joint extending at least over portions of the circumference of said housing parts, an adjuster means which is axially adjustably mounted in said further opening for compensating the axial length of the actuating device, said adjuster means capable of being held at a desired location, and including a discharge groove for discharging of fluid.

2. Housing in accordance with claim 1, wherein hollow spaces between the walls of said housing portions and between the walls of said adjuster means are filled with heat insulating material, and wherein the thickness of the walls and insulating material of said housing portions is equal to the thickness of the walls and insulating thickness of said adjuster means.

3. Housing in accordance with claim 2, wherein said heat insulating material is polyurethane foam.

4. Housing in accordance with claim 1, wherein said housing portions and said adjuster means are provided with a highly reflective coating on their inner walls.

5. Housing in accordance with claim 4, wherein said highly reflective coating is aluminum.

6. Housing in accordance with claim 1, wherein said adjuster means and said housing portions are made of a plastic material which is resistant to impact, scratch, ozone and mediums contacted during operation.

7. Housing in accordance with claim 6, wherein said plastic material is polypropylene.

8. Housing in accordance with claim 1, wherein said adjuster means include a threaded member.

9. Housing in accordance with claim 1, wherein said adjuster means is mounted in said further opening by means of a tongue and groove connection.

* * * * *